(12) United States Patent
Subrahmanyam et al.

(10) Patent No.: US 6,941,642 B1
(45) Date of Patent: Sep. 13, 2005

(54) HEAD STACK LOAD COMB FOR CONTROLLED HEAD LOADING

(75) Inventors: Jai N. Subrahmanyam, Santa Clara, CA (US); Serge Hauert, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 147 days.

(21) Appl. No.: 10/329,156

(22) Filed: Dec. 24, 2002

(51) Int. Cl.[7] .......................... G11B 5/127; H04R 31/00
(52) U.S. Cl. ............................. 29/603.03; 29/603.04; 29/603.05; 29/737; 360/254.3; 360/254.5; 360/254.6; 360/255.2; 360/255.3; 360/255.4; 360/255.5
(58) Field of Search .................. 29/603.03, 603.04, 29/603.05, 737; 360/254.3–254.5, 255.2–255.5

(56) References Cited

U.S. PATENT DOCUMENTS

| | | | | |
|---|---|---|---|---|
| 5,023,737 A | * | 6/1991 | Yaeger | 360/254.5 |
| 5,828,512 A | * | 10/1998 | Wada et al. | 360/75 |
| 6,243,222 B1 | * | 6/2001 | Boutaghou et al. | 360/73.03 |
| 6,577,473 B1 | * | 6/2003 | Macpherson et al. | 360/254.7 |

FOREIGN PATENT DOCUMENTS

JP 06150593 A * 5/1994 .......... G11B 21/12

OTHER PUBLICATIONS

"A unilateral three-level maser employing a ruby-loaded comb-type structure"; De Grasse, R.; Schulz-DuBois, E.; Scovil, H.; Solid-State Circuits Conference. Digest of Technical Papers. 1959 IEEE International, vol.: II, Feb. 1959; pp.:80-81.*

* cited by examiner

*Primary Examiner*—Paul D Kim
(74) *Attorney, Agent, or Firm*—Blakely, Sokoloff, Taylor & Zafman

(57) ABSTRACT

Disclosed is a head stack load comb used in the controlled loading of a head of a head stack assembly (HSA) onto a disk during the assembly of a disk drive. The HSA includes an actuator arm, a head, and a loading surface. The load comb includes a base structure and at least one ramp finger projecting approximately perpendicularly from the base structure. In order to load the head in a controlled manner onto the disk, the loading surface of the HSA is rotated along the ramp finger until the head is in a load position and then the base structure is actuated in a vertical direction such that the ramp finger is correspondingly actuated in the vertical direction towards the disk until the head is loaded onto the disk.

9 Claims, 9 Drawing Sheets

HEAD STACK LOAD COMB FOR CONTROLLED HEAD LOADING

BACKGROUND OF THE INVENTION

1. Field of the Invention

The present invention relates to disk drives. More particularly, the present invention relates to a head stack load comb for use in the assembly of a disk drive and a method of assembling a disk drive utilizing the head stack load comb, in which the head stack load comb provides for controlled head loading.

2. Description of the Prior Art and Related Information

A huge market exists for hard disk drives for mass-market host computer systems such as servers, desktop computers, and laptop computers. To be competitive in this market, a hard disk drive should be relatively inexpensive, and should accordingly embody a design that is adapted for low-cost mass production. Further, there exists substantial competitive pressure to continually develop hard disk drives that have increasingly higher storage capacity, that provide for faster access to data, and at the same time conform to decreasingly smaller exterior sizes and shapes often referred to as "form factors."

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly which may include the pivot bearing cartridge. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of arms projecting parallel to each other and perpendicular to the axis of the bore. The prefabricated head stack assembly also includes head gimbal assemblies that are supported by the arms. Each head gimbal assembly includes a load beam and a head supported by the load beam.

In the course of making a head disk assembly, the heads of the head stack assembly (HSA) are merged with the disks during an operation known as a "head-disk merge operation." As previously discussed, a head disk assembly often includes a base, a spindle motor, and plurality of disks mounted on the spindle motor. During the head-disk merge operation, a corresponding set of heads of the HSA is positioned proximate to the outside diameters of the disks utilizing a load comb. The load comb is used to separate the heads of the HSA. The load combs are typically ramped and the HSA is rotated such that lift tabs of the arms of the HSA slide down the ramped load comb until each head is rotated onto the disk such that the heads are "merged" with the disks. After the heads are merged with the disks, the load comb is removed.

Typically, in this arrangement, the load comb is made out of stainless steel. The slope of the ramps of the load comb is designed to load each head onto each disk with a low occurrence rate of head disk interactions. Head disk interactions, such as head slaps, may increase the risk of head and disk damage. Unfortunately, head disk interactions, such as head slaps, still occur and with time, and after many uses, the slope of the ramps of the load comb may change such that they may fail to adequately control the load velocity of the heads onto the disks properly. This failure to control the load velocity may lead to an increased rate of head slaps when heads of the HSA are merged onto disks. In addition, current ramps of load combs create a certain amount of lateral motion between the head and the disk when the head is merged to the disk, which increases the risk of head and disk damage due to head disk interactions.

SUMMARY OF THE INVENTION

The present invention relates to a head stack load comb for use in the assembly of a disk drive and a method of assembling a disk drive utilizing the head stack load comb, in which the head stack load comb provides for controlled head loading.

In one aspect, the invention may be regarded as a method for the controlled loading of a head of a head stack assembly (HSA) onto a disk during the assembly of a disk drive. The HSA includes an actuator arm, a head, and a loading surface. The method includes engaging the loading surface of the HSA onto a load comb and rotating the loading surface of the HSA along the load comb until the head is in a load position. Further, the method includes loading the head of the HSA onto the disk in a controlled manner by actuating the load comb in vertical direction towards the disk until the head is loaded onto the disk. Additionally, in some embodiments, the method may further include removing the load comb from the loading surface after the head of the HSA is loaded onto the disk. Moreover, in one embodiment, the load comb may include a base structure and at least one ramp finger projecting approximately perpendicularly from the base structure.

In a more detailed embodiment, the ramp finger of the load comb may comprise a bimetallic strip. In this case, loading the head of the HSA onto the disk in a controlled manner further includes providing current to the bimetallic strip of the ramp finger causing the ramp finger to be actuated in the vertical direction towards the disk until the head is loaded onto the disk. The amount of current provided to the bimetallic strip may be controlled utilizing a digital-to-analog converter (DAC) located in the base structure of the load comb.

In another embodiment, the base structure of the load comb may include a MicroElectricalMechanical system (MEMS) device. In this case, loading the head of the HSA onto the disk in a controlled manner includes providing current to the MEMS device causing the ramp finger to be moved in a vertical direction towards the disk until the head is loaded onto the disk. The amount of current provided to the MEMS device may be controlled utilizing a DAC located in the base structure of the load comb.

In another aspect, the invention may be regarded as a load comb used in the controlled loading of a head of a head stack assembly (HSA) onto a disk during the assembly of a disk drive. The HSA includes an actuator arm, a head, and a loading surface. The load comb includes a base structure and at least one ramp finger projecting approximately perpendicularly from the base structure. In order to load the head in a controlled manner onto the disk, the loading surface of the HSA is rotated along the ramp finger until the head is in a load position and then the base structure is actuated in a vertical direction such that the ramp finger is correspondingly actuated in the vertical direction towards the disk until the head is loaded onto the disk.

In a more detailed embodiment, the ramp finger of the load comb comprises a bimetallic strip. In this case, the loading of the head of the HSA onto the disk in a controlled manner is accomplished by providing current to the bimetallic strip of the ramp finger causing the ramp finger to be actuated in the vertical direction towards the disk until the head is loaded onto the disk. A digital-to-analog converter (DAC) located in the base structure of the load comb may be used to control the amount of current provided to the bimetallic strip.

In another embodiment, the base structure of the load comb may include a MicroElectricalMechanical system (MEMS) device. In this case, the loading of the head of the HSA onto the disk in a controlled manner is accomplished by providing current to the MEMS device, which causes the ramp finger to be moved in a vertical direction towards the disk until the head is loaded onto the disk. A DAC located in the base structure of the load comb may be used to control the amount of current provided to the MEMS device.

The foregoing and other features of the invention are described in detail below and set forth in the appended claims.

DETAILED DESCRIPTION

The present invention relates to a load comb and a method for using the load comb in the assembly of a disk drive, and particularly, to the use of the load comb in a head-disk merge operation during the assembly of a disk drive.

Figure 1:
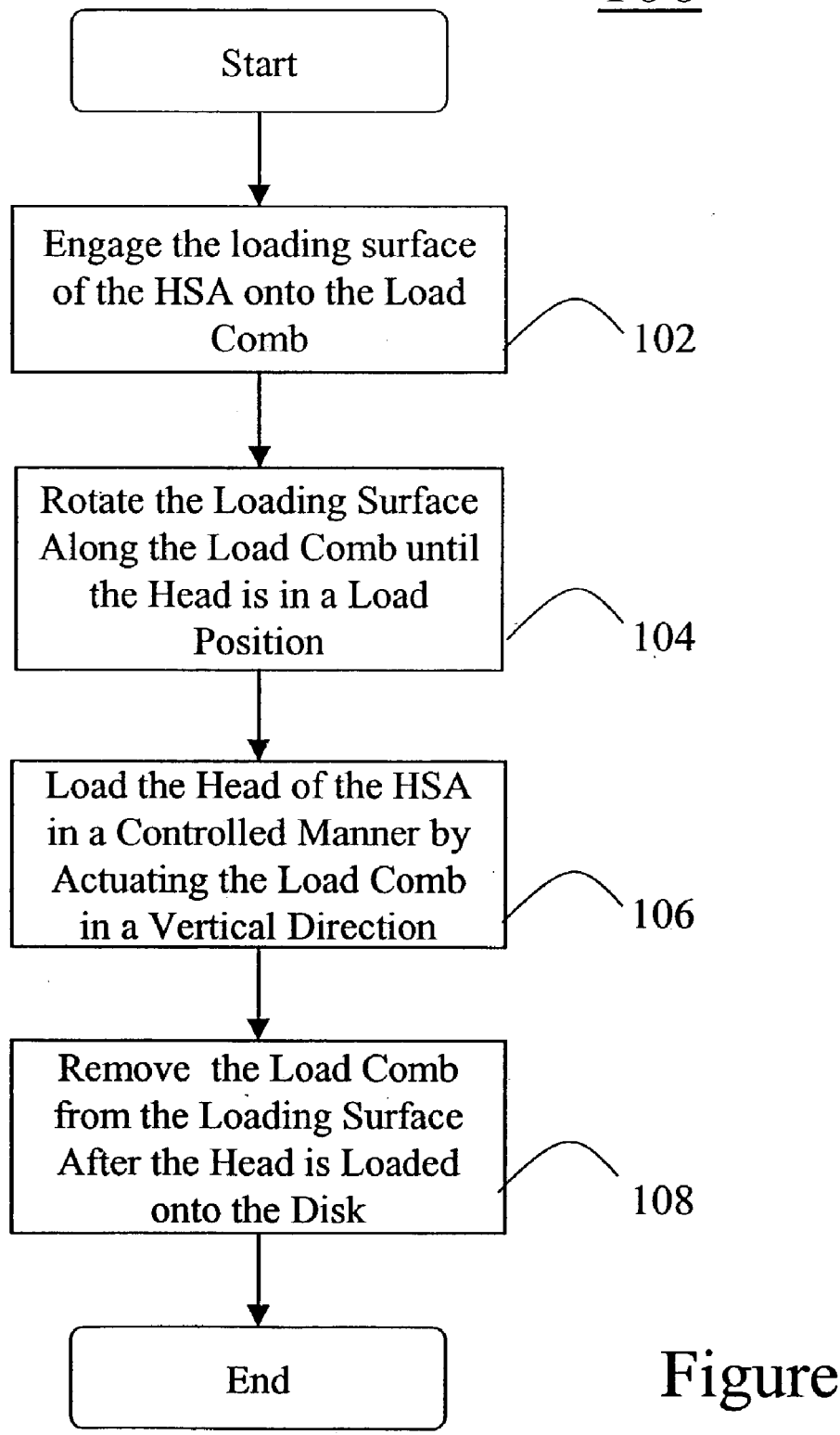
FIG. 1 is a flow diagram of a method for the controlled loading of a head of a head stack assembly (HSA) onto a disk during the assembly of a disk drive, according to one embodiment of the invention.

With reference to FIG. 1, FIG. 1 shows a method 100 for the controlled loading of a head of a head stack assembly (HSA) onto a disk during the assembly of a disk drive, according to one embodiment of the invention. Particularly, the method 100 is used during a head-disk merge operation. It should be appreciated that a HSA, as is known in the art, includes an actuator arm, a head, and a loading surface.

According to the method 100, at step 102, the loading surface of the HSA is engaged onto the load comb. Next, at step 104, the loading surface of the HSA is rotated along the load comb until the head is in a load position. At step 106, the head of the HSA is loaded onto the disk in a controlled manner. Loading the head in a controlled manner includes actuating the load comb in a vertical direction towards the disk until the head is loaded onto the disk. At this point, the head has been merged to the disk. Lastly, at step 108, the load comb may be removed from the loading surface after the head has been loaded onto the disk. This process can then be repeated, with the same load comb, to merge other HSAs with disks as part of an automated disk drive assembly operation.

The previously described method 100 will now be discussed with reference to a load comb, according to one embodiment of the present invention, in conjunction with an exemplary HSA that is used to illustrate how the load comb may be used to merge the head of an HSA to a disk.

Figure 2A:
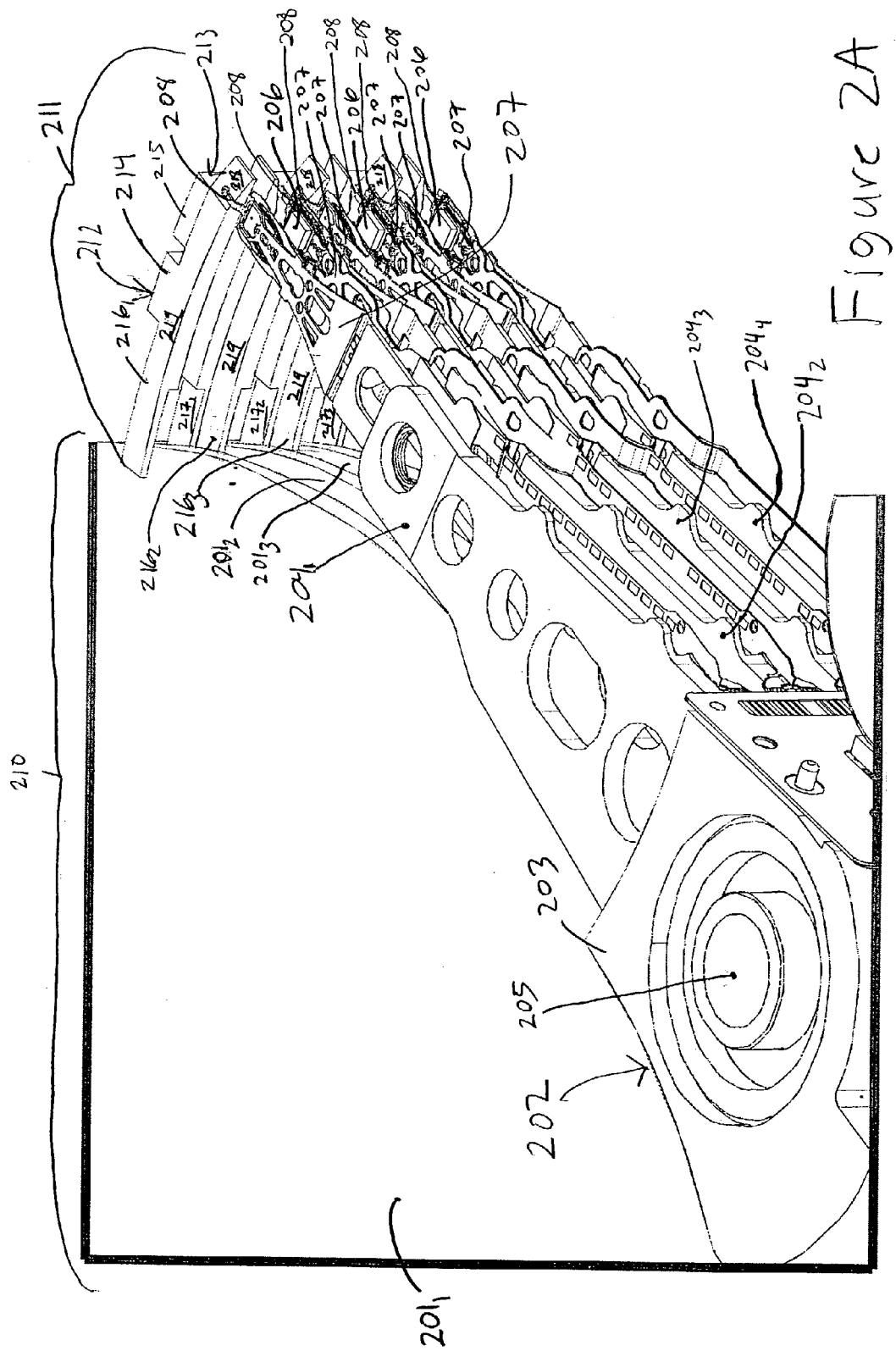
FIG. 2A is a perspective view of an HSA loaded onto a load comb, in which the load comb is in accordance with one embodiment of the present invention.

With reference now to FIG. 2A, FIG. 2A shows an example of an HSA 202 loaded onto a load comb 211. Particularly, FIG. 2A shows loading surfaces 208 associated with the heads 206 of the HSA 202 engaged onto the load comb 211. It should be appreciated that any type of loading surface can be utilized such as lift tabs or dimpled surfaces. In this embodiment, lift tabs 208 are utilized. FIG. 2A corresponds to the first step of the head-disk merge operation. Thus, at this point the loading tabs 208 have been loaded onto the load comb 211.

A brief description of the exemplary HSA 202 will now be given. It should be appreciated that this is only an example of an HSA 202 for use with the load comb 211 and that a wide variety of HSAs having differing types of structures may be used. This is but one example. In this example, the HSA 202 includes a plurality of actuator arms $204_{1-4}$ cantilevered from a body portion 203. The HSA 202 is rotatable about a pivot-bearing cartridge 205. Further, each actuator arm $204_{1-4}$ supports at least one head gimbal assembly (HGA) 207, respectively. Each HGA 207 includes a lift tab 208 and an associated head 206 for merging with a recording surface of a disk 201.

As shown in FIG. 2A, in this example, three disks $201_1$, $201_2$, $201_3$ are shown. Each disk $201_{1-3}$ has a top and bottom recording surface, respectively. It should be appreciated that the exemplary HSA 202 having four actuator arms $204_{1-4}$ for merging with the disk stack 210 having three disks $201_{1-3}$ is only an example to illustrate the operation of the load comb 211. It should further be appreciated that an HSA having any number of actuator arms with suitable HGAs for merging with a disk stack assembly having any number of disks may be utilized with a properly constructed load comb 211.

Figure 2B:
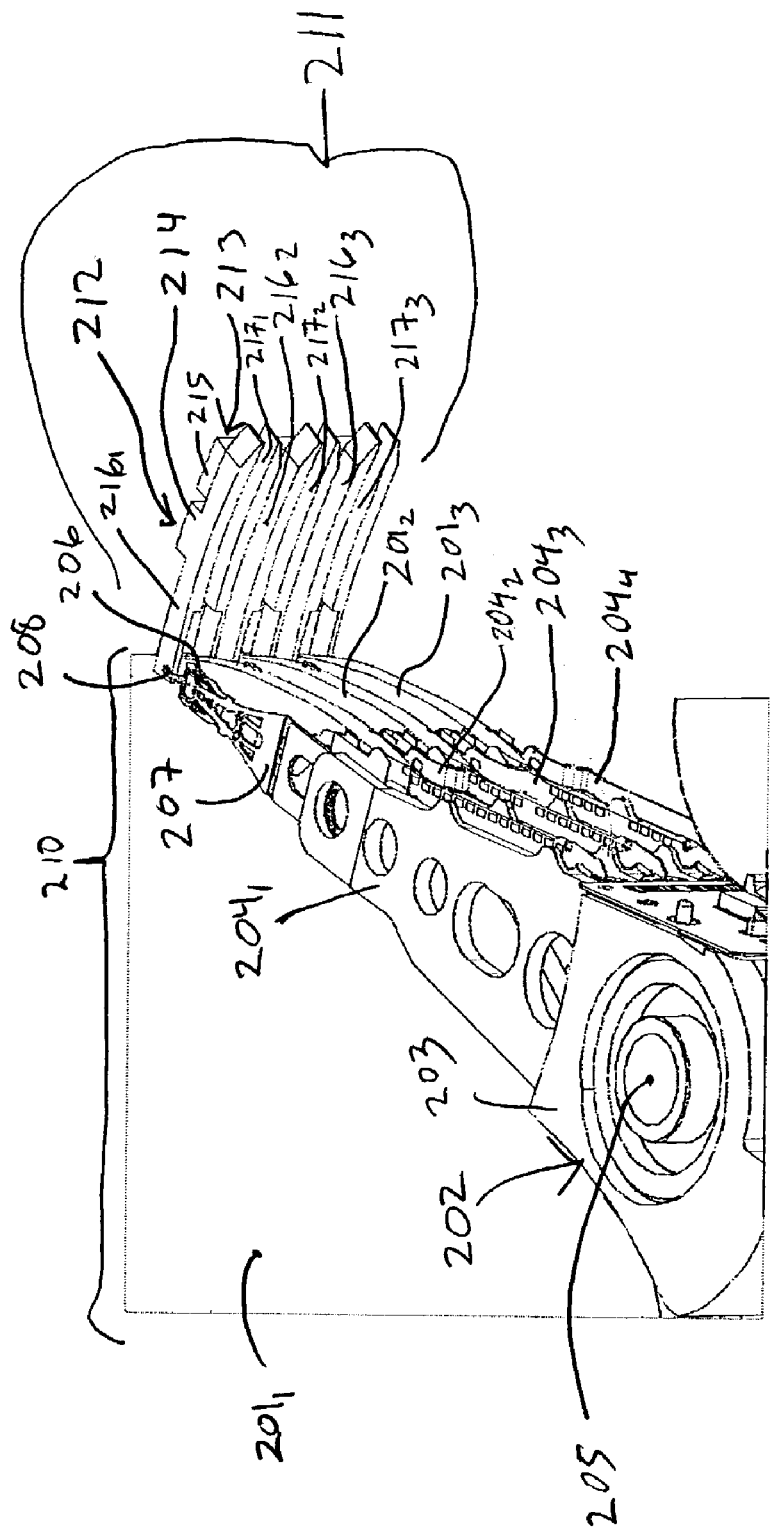
FIG. 2B is a perspective view illustrating that lift tabs associated with each head have been rotated along the load comb such that each of the heads are in a load position above or below the outer diameter of the top or bottom surface of each disk, respectively.
Figure 2C:
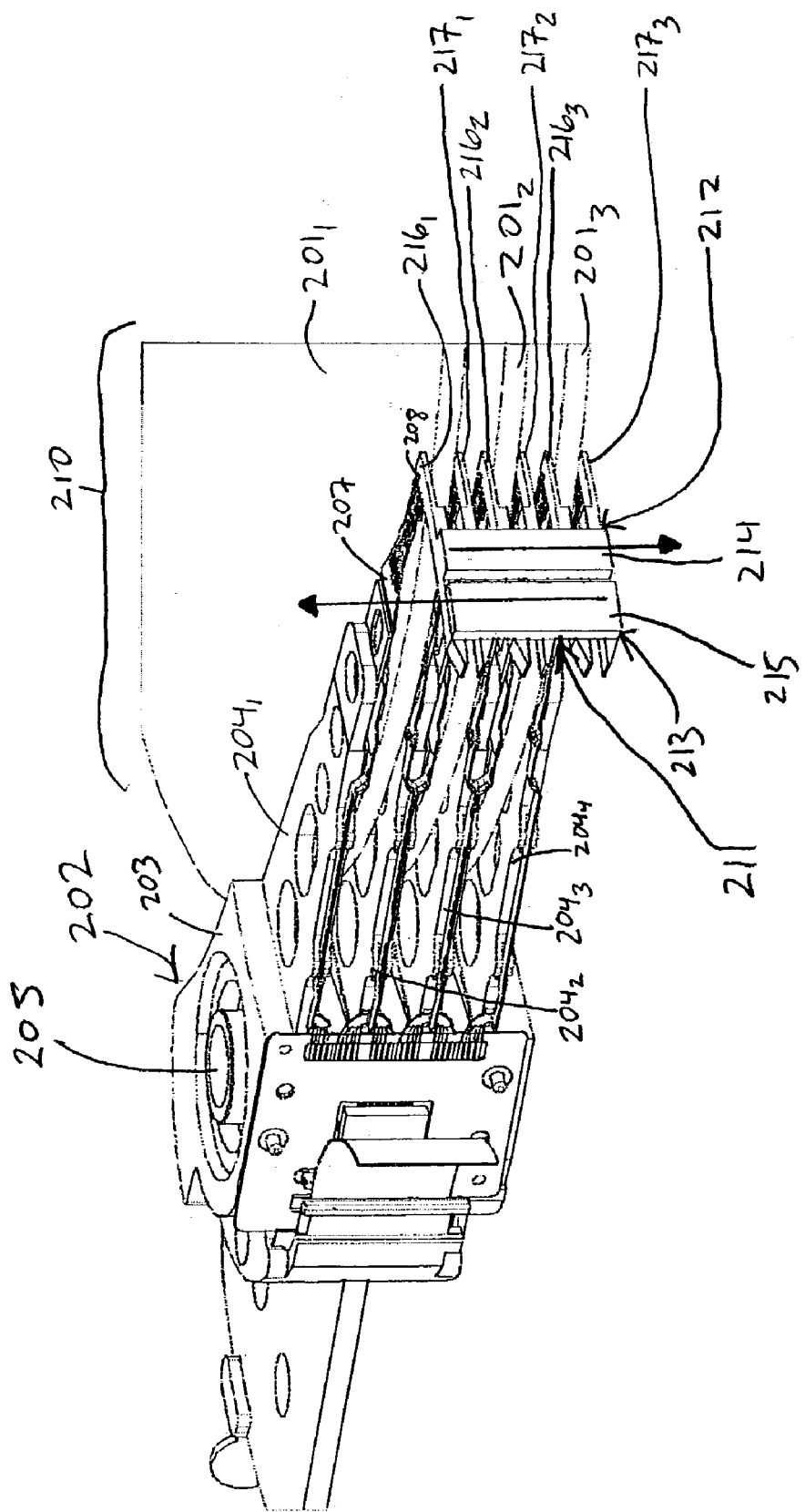
FIG. 2C is a perspective view illustrating the loading of each head of the HSA in a controlled manner onto the disks by actuating the load comb in vertical directions.
Figure 2D:
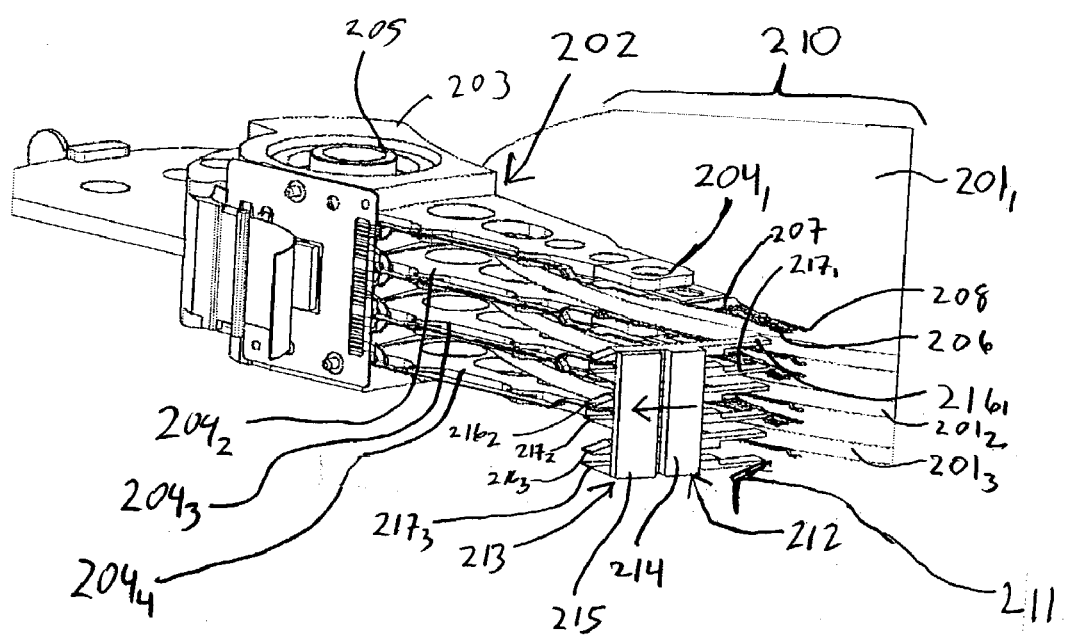
FIG. 2D is a perspective view illustrating the load comb being removed from the lift tabs of the HSA after the heads of the HSA have been loaded onto the disks.

Aspects of the load comb 211, according to one embodiment of the present invention, will now be discussed with reference to FIG. 2A. However, reference can also be made to FIGS. 2B–2D, which illustrate other views of the load comb 211, to aid in the illustration of the load comb 211. FIGS. 2B–2D will each be individually discussed in detail later.

The load comb 211 includes a first load comb sub-structure 212 and second load comb sub-structure 213. These two load comb sub-structures 212 and 213 may be separately formed and interlocked to one another or they may be integrally formed together. The first load comb sub-structure 212 includes a rectangularly-shaped base structure 214 and a plurality of ramp fingers $216_{1-3}$ that project approximately perpendicularly from the base structure 214. However, it should be appreciated that the first load comb sub-structure 212 may include any number of ramp fingers 216 depending upon the number of disks 201 in the disk stack assembly 210 for the disk drive being assembled—for which the load comb 211 is being used to perform the head-disk merge operation.

Each of the ramp fingers $216_{1-3}$ are identical in structure and function and therefore will be described generally as ramp fingers 216. Each ramp finger 216 includes a sloped lift tab loading surface 218 at a distal end upon which the lift tab 208 for an associated head 206 is engaged or loaded onto during the first step of the head-disk merge operation. Each ramp finger 216 further includes a ramp surface 219 that is used to extend above the top recording surface of the disk 201 to which the head 206 is to be merged.

Similarly, the second load comb sub-structure 213 includes a rectangularly-shaped base structure 215 and a plurality of ramp fingers $217_{1-3}$ projecting approximately perpendicularly from the base structure 215. Again, each of the ramp fingers $217_{1-3}$ are identical in structure and function and therefore will be described generally as ramp fingers 217. Each ramp finger 217 likewise includes a sloped lift tab loading surface (not shown) at a distal end upon which the lift tab 208 for an associated head 206 is engaged or loaded onto during the first step of the head-disk merge operation. Each ramp finger 217 further includes a ramp surface (not shown) that is used to extend below the bottom recording surface of the disk 201 to which the head 206 is to be merged.

It should be appreciated that first load comb sub-structure 212 having identical ramp fingers $216_{1-3}$ is similar in structure and function to second toad comb sub-structure 213 having identical ramp fingers $217_{1-3}$; except that ramp fingers $217_{1-3}$ are reversed in comparison to ramp fingers $216_{1-3}$ in order to allow a head 206 of an associated HGA 207 to merge with a respective bottom recording surface of a respective disk 201 whereas ramp fingers $216_{1-3}$ allow a head 206 of a respective HGA 207 to merge with a respective top recording surface of a respective disk 201. Accordingly, the first and second load comb sub-structures 212 and 213 and their respective ramp fingers $216_{1-3}$ and $217_{1-3}$ will be described generally together, as a description of one similarly applies to the other.

Turning now to FIG. 2B, FIG. 2B illustrates that the lift tabs 208 associated with each head 206 have each been rotated along the ramp surfaces of their respective ramp fingers $216_{1-3}$ and $217_{1-3}$ of each load comb sub-structure 212 and 213 respectively, such that each of the heads are in a load position above or below the outer diameter of the top or bottom recording surface of the disk $201_{1-3}$, respectively, to which they are to be loaded onto in a controlled manner. This is accomplished by the HSA 202 being rotated about the pivot-bearing cartridge 205 as part of the head-disk merger operation of the disk assembly process. Particularly, each head 206 is displaced vertically by a vertical displacement value from the surface of the disk 201 to which it is to be merged with. Upon merging, this vertical displacement value will become zero such that the head is loaded onto the disk.

It should be appreciated that during a static load, the disk is not rotating and thus when the head is loaded onto the disk the head actually contacts the disk. Alternatively, during a dynamic load, the disk is rotating and when the head is loaded onto the disk an air-bearing exists between the head and the rotating disk such that the head does not actually directly contact the disk. Typically, dynamic loads are performed at the outer diameter of the disk and static loads are performed at the inner diameter of the disk. However, it should be appreciated that either dynamic or static loads can be performed at either one of the inner or outer diameters of the disk, depending on what is desired.

Further, although embodiments of the inventions shown in FIGS. 2A–2C illustrate the loading of the heads 206 occurring at the outer diameters of the disks $201_{1-3}$, it should be appreciated that by suitably extending the ramps fingers $216_{1-3}$ and $217_{1-3}$ of the load comb 211 that inner diameter loads can just as easily be performed.

Referring now to FIG. 2C, FIG. 2C illustrates the loading of each head 206 of the HSA 202 onto the disks $201_{1-3}$ in a controlled manner by actuating the load comb 211 in vertical directions. Particularly, FIG. 2C shows that the first load comb sub-structure 214 is actuated in a vertical direction downwards towards the top surface of each the disk $201_{1-3}$ such that each ramp finger $216_{1-3}$ is correspondingly actuated in the vertical direction by a vertical displacement value towards the disk $201_{1-3}$ until the associated head 206 is loaded onto the top surface of the associated disk $201_{1-3}$. Similarly, the second load comb sub-structure 215 is actuated in a vertical direction upwards towards the bottom surface of each disk $201_{1-3}$ such that each ramp finger $217_{1-3}$ is correspondingly actuated in the vertical direction by a vertical displacement value towards the disk $201_{1-3}$ until the associated head 206 is loaded onto the bottom surface of the associated disk $201_{1-3}$.

Accordingly, the heads 206 of the actuator arms $204_{1-4}$ are loaded onto the top and bottom surfaces of the disks $201_{1-3}$ at their outer diameters, respectively, in a controlled manner. In this way, because the heads 206 are loaded in a controlled manner, the problem of head slaps and other problematic head disk interactions which increases the risk of head damage are reduced. Further, the problem of lateral motion between the head and disk, which increases the risk of head damage due to head disk interactions, is reduced.

Turning now to FIG. 2D, FIG. 2D shows the last step of the head-disk merge operation in which the load comb 211 is removed from the lift tabs 208 of the HSA 202 after the heads 206 of the HSA 202 have been loaded onto the disks $201_{1-3}$ at their outer diameters, respectively. Particularly, as shown in FIG. 2D, the load comb 211 is moved away perpendicularly from the merged HSA 202 and disks $201_{1-3}$ such that head-disk merge operations can be continued for a new HSA and a new disk stack for the assembly of a new disk drive utilizing load comb 211. Thus, load comb 211 may be utilized in an iterative process of performing head-disk mergers for the iterative manufacture of disk drives.

As previously discussed, the HSA 202 and disk stack 210 of disks $201_{1-3}$ used for illustrating the operation of the load comb 211 are only for illustrative purposes. The load comb 211 can be used with a wide variety of HSAs and disks in head-disk merge operations. Further, the load comb 211 according to embodiments of the present invention, has been illustrated with reference to six ramp fingers $216_{1-3}$ and $217_{1-3}$, however, it should be appreciated by those skilled in the art that the load comb 211 can be constructed with any number of ramp fingers depending upon the number of actuator arms and HGAs of the HSA to be merged with a corresponding number of disks.

Also, the ramp fingers $216_{1-3}$ and $217_{1-3}$ of the load comb 211 have been discussed moving in vertical directions by a vertical displacement values to merge respective heads to respective disks. It should be appreciated that these vertical displacement values can be predetermined individually for each ramp finger or for all of the ramp fingers together, and effectuated by a host computer operating the head-disk merge operation to move the load comb 211 such that either the selected ramp fingers or all of the ramp fingers in unison are moved by the predetermined vertical displacement values. Alternatively, the host computer can cause the load comb 211 to move the ramp fingers individually or in unison in vertical directions by continuously updated vertical displacement values calculated between the heads and surfaces of the disk as part of a feedback system; wherein these vertical displacement values can be continuously calculated by well-known measurement and feedback systems.

Figure 3A:
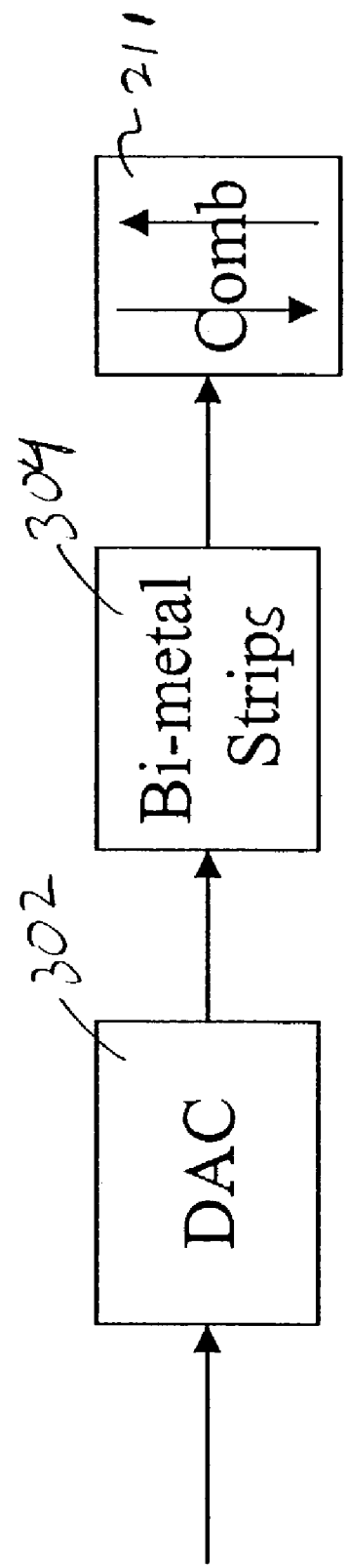
FIG. 3A is block diagram illustrating that the ramp fingers of the load comb may comprise bimetallic strips in order to actuate the load comb in vertical directions, according to one embodiment of the invention.

Particular embodiments of the load comb 211 will now be discussed. For example, with reference to FIG. 3A, FIG. 3A shows that in one embodiment, each of the ramp fingers $216_{1-3}$ and $217_{1-3}$ of the load comb 211 may comprise bimetallic strips 304. Bimetallic strips are well known in the art. Basically, by applying a positive or negative current or voltage to a bimetallic strip ramp finger, the bimetallic strip ramp finger expands in one direction or the other. Accordingly, the load comb 211 is moved in an appropriate up or down vertical direction. Thus, the heads 206 of the HSA 202 can be merged onto the disks $201_{1-3}$ in a controlled manner by providing current to the bimetallic strip ramp fingers $216_{1-3}$ and $217_{1-3}$ causing the ramp fingers to be actuated in appropriate up or down vertical directions towards the disks $201_{1-3}$ until the heads 206 merge with the respective bottom or top surfaces of the disks, respectively, as was previously discussed with reference to FIG. 2C.

This can be accomplished, as shown in FIG. 3A, by a digital-to-analog converter (DAC) 302 that provides positive or negative current to bimetallic strips 304, or more particularly, to bimetallic strip ramp fingers $216_{1-3}$ and $217_{1-3}$ of the load comb 211—causing the bimetallic strip ramp fingers to be actuated vertically in appropriate directions such that each head 206 is loaded onto the appropriate top or bottom surface of the corresponding disk $201_{1-3}$ in a controlled manner, as discussed with reference to FIG. 2C. In one embodiment, the DAC 302 can be located in the base structure 214 or 215 of the load comb 211.

Figure 3B:
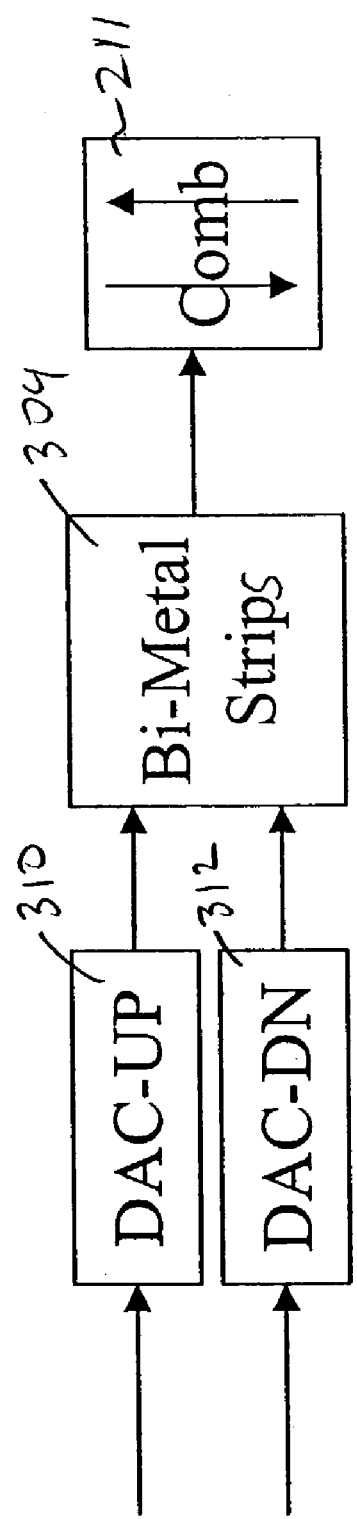
FIG. 3B is an alternative embodiment of FIG. 3A in which two DACs are utilized instead of one, according to one embodiment of the invention.

Alternatively, with reference to FIG. 3B, two DACs may be utilized. An up DAC, DAC-UP 310 (which my be located in base 215), provides current to the bimetallic strip ramp fingers $217_{1-3}$ such that the bimetallic strip ramp fingers $217_{1-3}$ are moved in an upwards vertical direction and a down DAC, DAC-DN 312 (which may be located in base 214), provides current to the bimetallic strip ramp fingers $216_{1-3}$ to move the bimetallic strip ramp fingers $216_{1-3}$ in the vertical direction downwards towards the disk such that the heads 206 are merged to the corresponding bottom and top surfaces of disks $201_{1-3}$ as discussed with reference to FIG. 2C.

As previously discussed, each of the bimetallic strip ramp fingers $216_{1-3}$ and $217_{1-3}$ can be controlled in unison or separately by a host computer controlling the merge-disk operation. Further, the host computer can control the amount of vertical movement of the bimetallic strip ramp fingers $216_{1-3}$ and $217_{1-3}$ by controlling the DACs to provide a specific amount of current to the bimetallic strip ramp fingers to move the ramp fingers by the desired vertical displacement value such that each head 206 properly merges to the top or bottom surface of each disk $201_{1-3}$ in a controlled manner, as discussed with reference to FIG. 2C. As previously discussed, the vertical displacement values for each ramp finger can be predetermined values or they can be continuously calculated as part of a feedback system.

Further, in this arrangement, the load velocity of the heads 206 can be reliably controlled over the life of the load comb 211 because the currents can be adjusted to the granularity of the DACs that are used to control the load current or voltage. Moreover, since the bimetallic strip ramp fingers are metallic, the same load comb 211 can be used for long periods of time because of the low wear and tear associated with the metals used. The metallic nature could also potentially reduce particulate residue and improve product reliability.

In another embodiment, the base structures 214 and 215 of the load comb 211 each may include a MicroElectrical-Mechanical system (MEMS) device. MEMS devices are known in the art. In this embodiment, a MEMS device of each base 214 and 215 may be coupled to each of the associated ramp fingers $216_{1-3}$ and $217_{1-3}$ of each base, respectively, wherein the loading of the heads 206 of the HSA 202 onto the disks $201_{1-3}$ in a controlled manner may include providing current to the MEMS devices to cause the ramp fingers $216_{1-3}$ and $217_{1-3}$ to be moved in appropriate up or down vertical directions towards the bottom and top surfaces of disks $201_{1-3}$ respectively, until the heads 206 merge with the disks $201_{1-3}$, as previously discussed with reference to FIG. 2C.

Figure 4A:
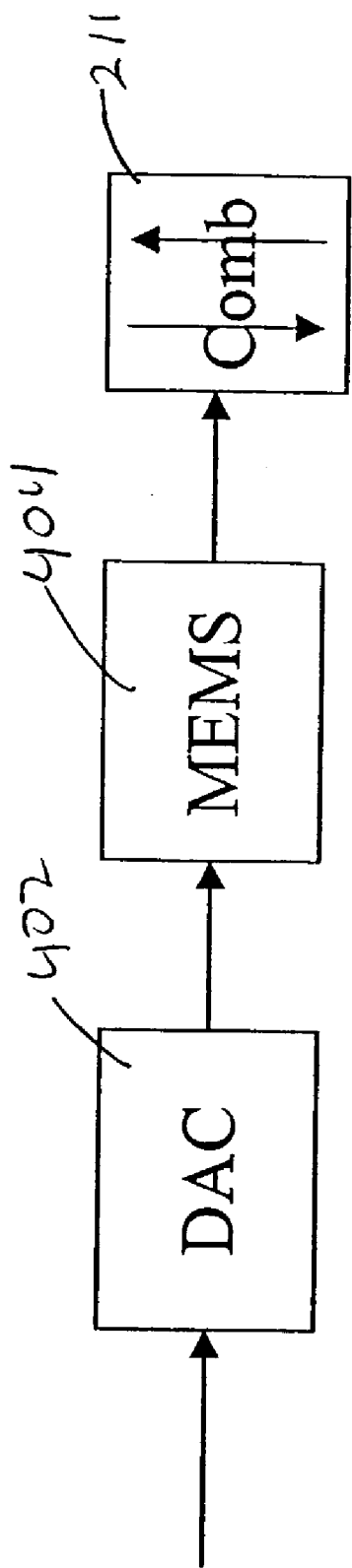
FIG. 4A is a block diagram illustrating that a MEMS device may be used to move the load comb in vertical directions, according to one embodiment of the invention.

With reference FIG. 4A, FIG. 4A shows an embodiment in which a DAC 402 is used to control the amount of current provided to the MEMS device 404 such that the load comb 211 is moved in appropriate up or down vertical directions. In this embodiment, a DAC 402 may be located in each of the base structures 214 and 215 of the load comb 211, respectively. Thus, the DACs provide current to the MEMS devices of bases 214 and 215, in order to move the ramp fingers $216_{1-3}$ and $217_{1-3}$ of the load comb 211, respectively, such that the ramp fingers are moved in appropriate up or down vertical directions towards the disks $201_{1-3}$ until each corresponding head 206 merges with the appropriate bottom or top surface of the appropriate disk $201_{1-3}$ as previously discussed with reference to FIG. 2C.

Figure 4B:
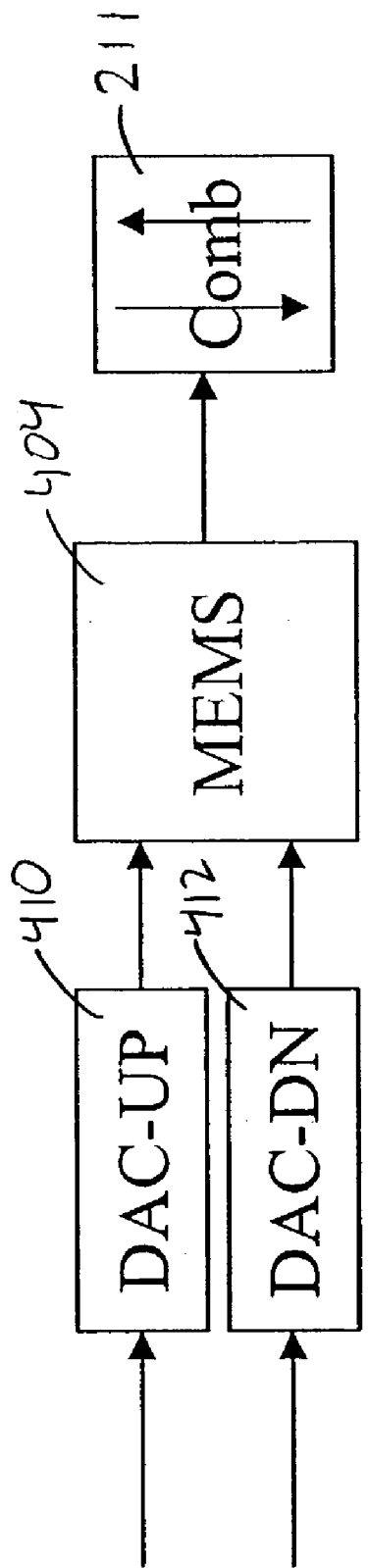
FIG. 4B is an alternative embodiment of FIG. 4A in which two DACs are utilized instead of one, according to one embodiment of the invention.

In another embodiment, as shown in FIG. 4B, an up DAC, DAC-UP 410 (which may be located in base 215), may be utilized to provide a current or voltage to the MEMS device of base 215 in order to move the ramp fingers $217_{1-3}$ of the load comb 211 in an upwards vertical direction; whereas a down DAC, DAC-DN 412 (which may be located in base 214), may be utilized to provide a current or voltage to the MEMS device of base 214 in order to move the ramp fingers $216_{1-3}$ of the load comb 211 in a downwards direction. In this way, the ramp fingers $216_{1-3}$ and $217_{1-3}$ are moved in the appropriate up or down vertical directions towards each bottom or top surface of each disk $201_{1-3}$ respectively, until each corresponding head 206 merges with each disk 201$_{1-3}$, as previously discussed with reference FIG. 2C.

Again, as with the bimetallic strips, by utilizing a MEMS device to move the ramp fingers 216$_{1-3}$ and 217$_{1-3}$, the load velocity can be reliably controlled over the life of the load comb 211 because the currents can be adjusted to the granularity of the DAC that is used to control the load current or voltage. In this way, head disk interactions, such as head slaps, and lateral motion can be avoided when merging heads to disks, as previously discussed.

Also, as previously discussed, each of the ramp fingers 216$_{1-3}$ and 217$_{1-3}$ can be controlled in unison or separately through the MEMS devices of each base 214 and 215, respectively, by a host computer controlling the merge-disk operation. Further, the host computer can control the amount of vertical movement imparted to the ramp fingers 216$_{1-3}$ and 217$_{1-3}$ by the MEMS devices by controlling the DACs to provide a specific amount of current to the respective MEMS device to move the respective ramp fingers by the desired vertical displacement values such that each head 206 properly merges to the top or bottom surface of each disk 201 in a controlled manner, as discussed with reference to FIG. 2C. As previously discussed, the vertical displacement values for each ramp finger can be predetermined values or they can be continuously calculated as part of a feedback system.

Also, it should be appreciated by those skilled in the art that although the load comb has only been described as loading heads onto the outer diameter of disk, that alternative embodiments of the load comb may just as easily be configured to load the heads onto the disk as part of the head-disk merge operation at the inner diameter of the disk.

Other modifications and embodiments will occur to those of skill in this art and all such modifications and other embodiments are deemed to fall within the scope of the present invention.

We claim:

1. A load comb used in the controlled loading of a head of a head stack assembly (HSA) onto a disk during the assembly of a disk drive, the HSA including an actuator arm, a head, and a loading surface, the load comb comprising:
   a base structure; and
   at least one ramp finger projecting approximately perpendicularly from the base structure, the ramp finger including a bimetallic strip;
   wherein, in order to load the head in a controlled manner onto the disk, the loading surface of the HSA is rotated along the ramp finger until the head is in a load position and then the base structure is actuated in a vertical direction by providing current to the bimetallic strip of the ramp finger causing the ramp finger to be actuated in the vertical direction towards the disk until the head is loaded onto the disk.

2. The load comb of claim 1, further comprising a digital-to-analog converter (DAC) located in the base structure of the load comb, the DAC to control the amount of current provided to the bimetallic strip.

3. The load comb of claim 1, wherein the head of the HSA is loaded in the controlled manner onto the disk at an outer diameter of the disk.

4. The load comb of claim 1, wherein the head of the HSA is loaded in the controlled manner onto the disk at an inner diameter of the disk.

5. A load comb used in the controlled loading of a head of a head stack assembly (HSA) onto a disk during the assembly of a disk drive, the HSA including an actuator arm, a head, and a loading surface, the load comb comprising:
   a base structure including a MicroElectricalMechanical system (MEMS) device; and
   at least one ramp finger projecting approximately perpendicularly from the base structure;
   wherein, in order to load the head in a controlled manner onto the disk, the loading surface of the HSA is rotated along the ramp finger until the head is in a load position and then the base structure is actuated in a vertical direction such that the ramp finger is correspondingly actuated in the vertical direction towards the disk until the head is loaded onto the disk.

6. The load comb of claim 5, wherein loading the head of the HSA onto the disk in a controlled manner further includes providing current to the MEMS device causing the ramp finger to be moved in the vertical direction towards the disk until the head is loaded onto the disk.

7. The load comb of claim 5, further comprising a digital-to-analog convert (DAC) located in the base structure of the load comb, the DAC to control the amount of current provided to the MEMS device.

8. The load comb of claim 5, wherein the head of the HSA is loaded in the controlled manner onto the disk at an outer diameter of the disk.

9. The load comb of claim 5, wherein the head of the HSA is loaded in the controlled manner onto the disk at an inner diameter of the disk.

* * * * *